July 28, 1959  R. M. PINETTE  2,896,319
AUTOMATIC CAN OPENER
Filed Nov. 1, 1956  5 Sheets-Sheet 1

INVENTOR.
ROBERT M. PINETTE.
BY
Louis V. Lucia
ATTORNEY.

July 28, 1959

R. M. PINETTE 2,896,319

AUTOMATIC CAN OPENER

Filed Nov. 1, 1956

INVENTOR.
ROBERT M. PINETTE.
BY
*Louis V. Lucia*
ATTORNEY.

July 28, 1959

R. M. PINETTE

2,896,319

AUTOMATIC CAN OPENER

Filed Nov. 1, 1956

INVENTOR.
ROBERT M. PINETTE.
BY
Louis V. Lucia
ATTORNEY.

July 28, 1959

R. M. PINETTE

2,896,319

AUTOMATIC CAN OPENER

Filed Nov. 1, 1956

INVENTOR.
ROBERT M. PINETTE.
BY
Louis V. Lucia
ATTORNEY.

July 28, 1959  R. M. PINETTE  2,896,319
AUTOMATIC CAN OPENER
Filed Nov. 1, 1956                                        5 Sheets-Sheet 5

INVENTOR.
ROBERT M. PINETTE.
BY
ATTORNEY.

United States Patent Office 2,896,319
Patented July 28, 1959

2,896,319

AUTOMATIC CAN OPENER

Robert M. Pinette, Manchester, Conn.

Application November 1, 1956, Serial No. 619,861

32 Claims. (Cl. 30—4)

This invention relates to an automatic can opener and more particularly to a power driven device for automatically opening cans upon being inserted into said device.

An object of the present invention is to provide such a can opener which is extremely simple to operate and which will require merely that the can be inserted into the device to initiate the operation thereof with the use of only one hand.

A further object is to provide such a device which will automatically terminate its operation upon the opening of the can having been completed.

A still further object of this invention is the provision of an electrically driven can opener which is adaptable to cans of different sizes and flanges of different heights and thickness which will automatically terminate the operation of the device when the cover of the can has been completely cut off.

Further objects and advantages of this invention will be more clearly understood from the following description and the accompanying drawings in which.

Figure 7:
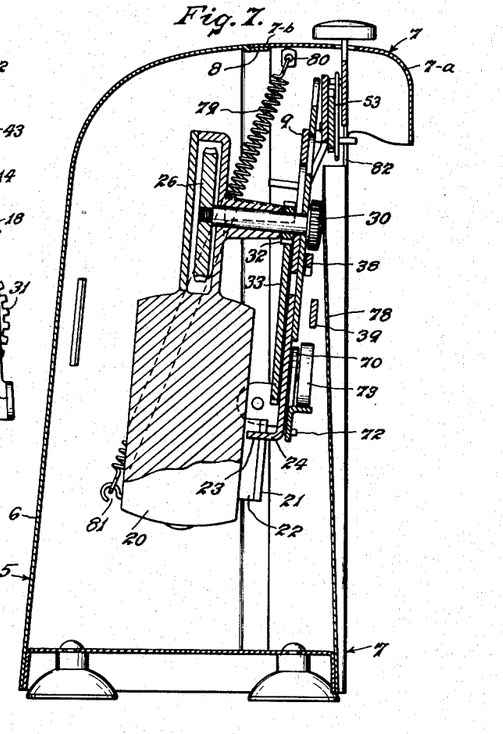
Fig. 7 is a sectional side view on line 7—7 of Fig. 4.

In the embodiment of my invention which is illustrated in the drawings, the numeral 5 denotes a case having a rear section 6 and a front section 7 which has a hood portion 7-a extending forwardly therefrom. The said rear and front sections are interconnected by means of a flange 8 projecting from one of said sections and fitting within the free edge portion 7-b of the other section as shown in Fig. 7.

Within the said casing, there is mounted the improved mechanism for said device which is generally constructed from sheet metal stampings and includes a supporting plate 9 having ears 10—10 extending perpendicularly therefrom and by means of which the said plate is preferably pivotally mounted to the casing by screws 11—11 which extend through the flange 8 and edge portion 7-b and also secure the two casing sections together. Upon the said supporting plate, there is mounted a carrier plate 12 having perpendicularly extending feet 13 and 14 by means of which the said carrier plate is mounted upon the supporting plate 9 and movable thereon in two directions. The foot 13 extending through a notch 15 in the supporting plate and being hooked over the bottom of said notch provides a pivotal connection for the member 13 on a plane parallel to the supporting plate and the foot 14 extending through an opening 16 and being hooked over the side of said opening secures the respective side of the carrier plate to the supporting plate and also limits the pivotal movement thereof by abutting the upper edge of the opening 16. A spring 17 is anchored upon an ear 18 projecting from the supporting plate 9 and is connected to the foot 14 to urge the carrier plate 12 downwardly into normal position and against the lower edge of the opening 16.

It will be noted that the said spring will pull the plate 12 toward the right, as viewed in Fig. 6, and downwardly and thereby retain the hook of the foot 13 in engagement with the notch 15 and at the same time force the said carrier plate downwardly on the supporting plate for the purpose to be hereinafter described. The supporting plate is provided at its upper portion with fingers 19—19 which are bent forwardly to abut the rear surface of the carrier plate 12 and limit the rearward pivotal movement thereof under the tension of the spring 17.

At the rear of the said supporting plate, there is mounted a motor 20 having a boss 21 with a dovetailed slot 22 which receives a dovetail 23 of a supporting finger 24 which projects rearwardly from the supporting plate and slidably mounts the motor 20 thereon. The said motor drives a worm pinion 25 which in turn drives a worm gear 26 that is mounted upon a drive shaft 27 which extends through a vertical slot 28 in the carrier plate and through a carrier lever 29 that is fulcrumed upon said shaft and disposed in front of the carrier plate. The said shaft carries upon its front end a feed wheel 30 having suitable teeth 31 facing in one direction for engaging the flange of a cam and feeding said cam during a can opening operation. The said shaft 27 also carries thereon a pinion 32 which is fixed thereto and meshes with an operating gear 33 that is mounted on a spindle 34 which extends through a cam slot 35, in the supporting plate 9, having a cam portion 36 for the purpose to be hereinafter described.

The spindle 34 is rotatably mounted upon the carrier lever 29 and has upon its outer end a pinion 37 that is disposed upon the front of the lever.

Figure 15:
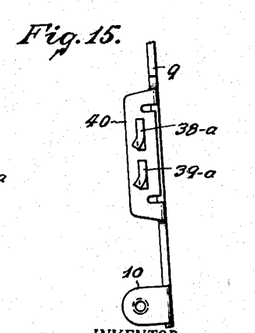
Fig. 15 is a side view thereof.

A pair of shiftable racks 38 and 39 are pivotally mounted in a flange 40, which extends vertically upon the front of the supporting plate and each of said racks has a series of teeth, 41 and 42, respectively, which are adapted to mesh with the pinion 37 upon being shifted into meshing position relatively thereto. The said racks are mounted in the flange 40 by means of end portions 38-a and 39-a which extend through holes 38-b and 39-b in the said flange and are sufficiently loose therein to provide pivotal movement of said racks for bringing the teeth thereof into and out of engagement with the pinion 37. As shown in Fig. 15, the said end portions 38–a and 39–a are crimped so as to retain them in operative position in their respective holes.

Figure 13:
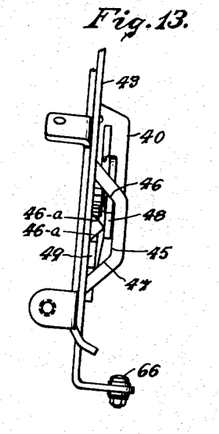
Fig. 13 is a side view of a portion of the mechanism with the parts thereof in operating position.
Figure 14:
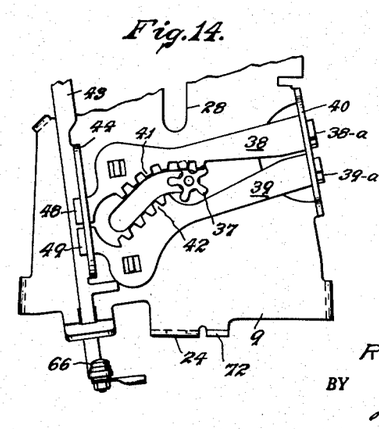
Fig. 14 is a front view thereof.

A shifting bar 43 is vertically movable upon the supporting plate and has a vertical flange 44 with an opening 45 therein, as shown in Fig. 13, having cam portions 46, 46–a, 47 and 47–a which cooperate with the end portions 48 and 49 of the racks 38 and 39, respectively, for alternately shifting said racks into meshing and unmeshing positions relatively to the spindle 37.

The said shifting bar 43 has pivotally connected thereto, at 50, a lever 51 which is fulcrumed upon the carrier plate 12, at 52, and carries a suitable feeler member in the form of a spring 53 that is anchored at one end about a rearwardly extending projection 54 on said lever 51 and has its free end in engagement with an abutment 55, also on said lever.

The said racks 38 and 39 are movably retained against vertical movement with the shifting bar 43 by means of studs 56 and 57 that project forwardly from the supporting plate and extend through apertures in said racks to allow them to be shifted into meshing and non-meshing positions relatively to the pinion 37 while preventing them from being displaced vertically by the shifting movement of the bar 43.

The carrier plate 12 has pivotally mounted thereon, at 58, a cutter member 59 which has a piercing and cutting portion 60 that is adapted to be projected below can locating shoes 61—61 which extend forwardly from said carrier plate at each side of the cutter member. The said cutter member also has an extension 62 with a perpendicular projection 63 thereon that extends rearwardly from the cutter member through an arcuate slot 64 in the carrier plate and through a cam slot 65 in the lever 29 which has cam sides for engaging the said projection 63 and operating the cutter member.

The shifting bar 43 carries an electrical contact member 66 that is insulated from said bar and has connected thereto a conductor 67 of an electrical circuit for operating the motor 20. The said contact member is engageable with a cooperating contact member 68 that has the other wire 69 of said electrical circuit connected thereto and is mounted upon a lever 70 which is fulcrumed at 71, upon the supporting plate 9 and normally rests upon a supporting projection 72 that extends forwardly from said supporting plate. The said lever 70 carries thereon a suitable spring member 73 which is looped upwardly therefrom and disposed in the path of a projection 74 that extends from the lower end of the lever 29 for the purpose to be also hereinafter described.

A finger 75 is provided upon the lever 43 and is disposed adjacent to the front face of the plate 9 so as to prevent rotating movement of the said bar and to retain it in operating position relatively to the end portions 48 and 49.

The lever 51 is provided with a portion 76 which extends vertically therefrom through an opening in the top of the casing and has upon its upper end a suitable knob 77 that may be manually operated for moving the lever 51.

Figures 10, 18, 19, 20:
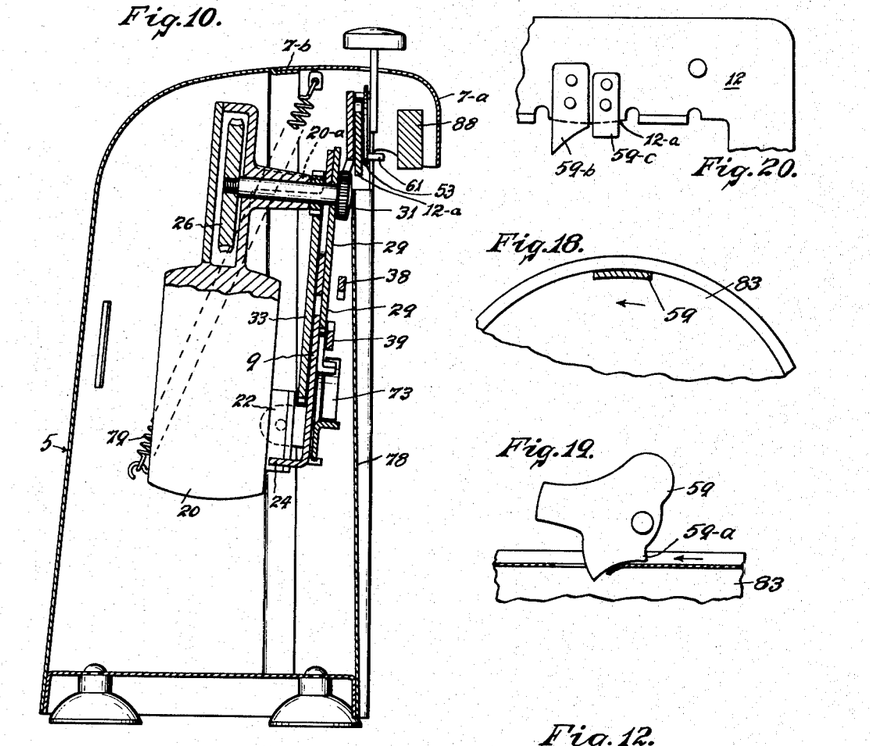
Fig. 10 is a sectional side view taken on line 10—10 of Fig. 8.
Fig. 18 is a plan view illustrating the operation of the cutter member.
Fig. 19 is a front view thereof.
Fig. 20 is a front view illustrating a modified form of cutter.

As clearly illustrated in Figs. 7 and 10, the casing 5 has a front wall with a portion 78 which is curved inwardly and disposed at an angle to said wall whereby the said portion is inclined inwardly from the wall and provides an abutment which is engaged by the front of the feed wheel 30 and thereby locates the cutting mechanism at a forward angle under the influence of a spring 79 that has one end secured to the upper portion of the casing, at 80, and the other end secured to the motor, at 81, for swinging the upper portion of the mechanism forwardly about the pivoting screws 11—11 and yieldingly urging the cutter wheel into contact with the inner surface of the front wall 78. The upward pull of the spring 79 upon the motor 20 also operates to raise the entire mechanism and thereby facilitates the movement of said mechanism into cutting position by the cam slot 36. The upper end of said motor is preferably positioned relatively to the supporting plate 9 by means of stops 20–a which abut the back surface of the supporting plate and allow upward movement of the motor relatively thereto while the lower portion of the motor is retained slidably connected to said supporting plate by means of the dovetailed projection 22 and the cooperating finger 23.

The upper portion of the said front wall terminates in a free edge which provides an opening 82 in the case that is located above said wall and extends into the projection 7–a. The upper portion of the cutting mechanism is located above the said front wall and extends forwardly into said opening so that the cutter member 59 is disposed in position to engage the cover of a can placed against the front of said wall and the stops 61—61 are in position to engage the upper edge of the can flange and retain it rotatably in position during the cutting operation, as clearly illustrated in Figs. 11 and 12 of the drawings.

If desired, a suitable permanent magnet, indicated at 88, may be provided for retaining the can cover thereon and thereby preventing it from falling into the can after it has been cut off.

The operation of my improved can opening device above described is as follows:

When it is desired to open a can, such as indicated at 83 in Figs. 11, 12, 18 and 19 it is simply placed against the front wall of the casing, within the vertical depression 84, and raised until its flange engages the locating shoes 61—61 and the cover of the can engages and raises the spring 53 which in turn raises the lever 51 about its fulcrum 52. This moves the bar 43 upwardly and the cam 46–a moves the rack 38 out of the path of the pinion 37 while the cam 47 shifts the rack 39 so as to bring the teeth 42 thereof against the pinion 37. At the same time, said upward movement of the bar 43 causes engagement of the contact 66 thereon with the contact 68 on the lever 70 and this closes the electric circuit and energizes the motor 20 which, through the worm pinion 25 and the worm gear 26, drives the pinion 37. The said pinion then meshes with the teeth 42 and causes the spindle 34 to roll upwardly in the cam slot 35 and to carry the lever 29 therewith into the position illustrated in Fig. 8 wherein the said spindle rests in the locking portion 36 of the cam slot.

Figure 11:
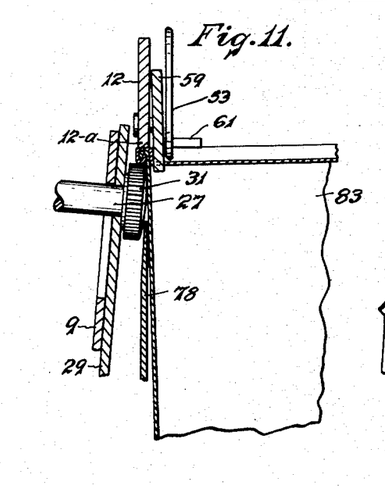
Fig. 11 is an enlarged sectional fragmentary view showing parts of the mechanism in operating position.
Figure 12:
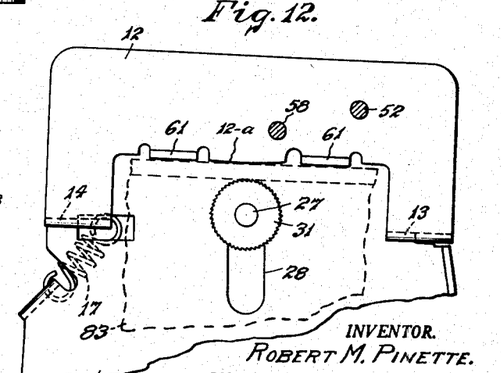
Fig. 12 is a front view thereof.

The upward movement of the lever 29 raises the drive shaft 27 in the slot 28 and thereby raises the feed wheel along the inner surface of the front wall 78, as it is yieldingly urged into contact with said surface by the spring 79, until it reaches the position illustrated in Figs. 11 and 12 wherein the said feed wheel is above the upper edge of the wall 78 and engages the underside of the flange on the can. The said upward movement of the lever 29 also causes it to swing about the shaft 27 as it rises and the cam slot 65 of said lever then rotates the cutter 59 about its pivot 58 and forces the cutting point 60 thereof downwardly to piece and project below the can cover. Rotation of the feed wheel 30 by the gear 26 then causes said feed wheel to rotate the can relatively to the cutter by engagement of the teeth 31 with the bottom side of the flange on the can, and thereby causes the cover of the can to be cut off. During the cutting operation, the said cutter is urged against the flange of the can by the spring 17 to cut the cover closely and smoothly along the inner wall of the can and flatten the severed portion of the cover remaining on the can against said inner wall.

Figure 1:
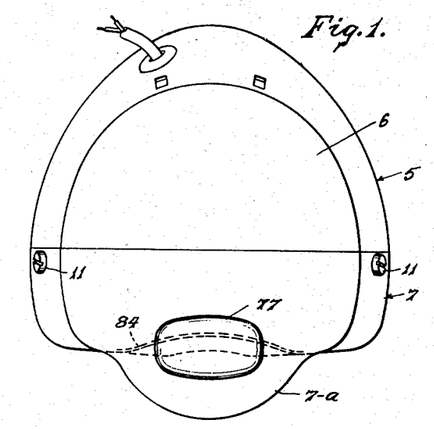
Fig. 1 is a plan view of a device embodying the present invention.
Figure 2:
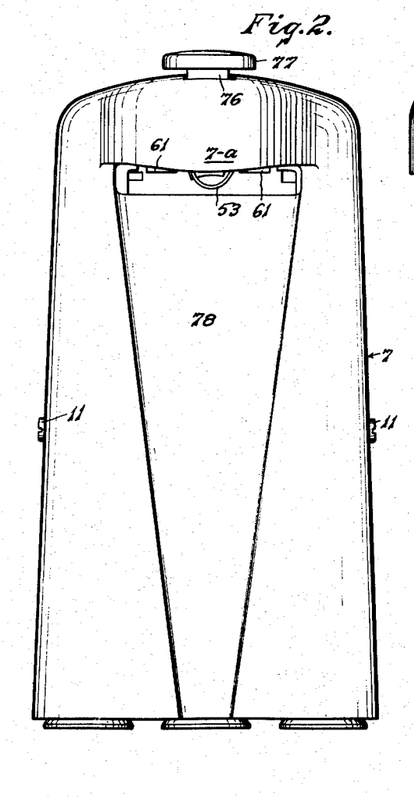
Fig. 2 is a front view of said device.
Figure 3:
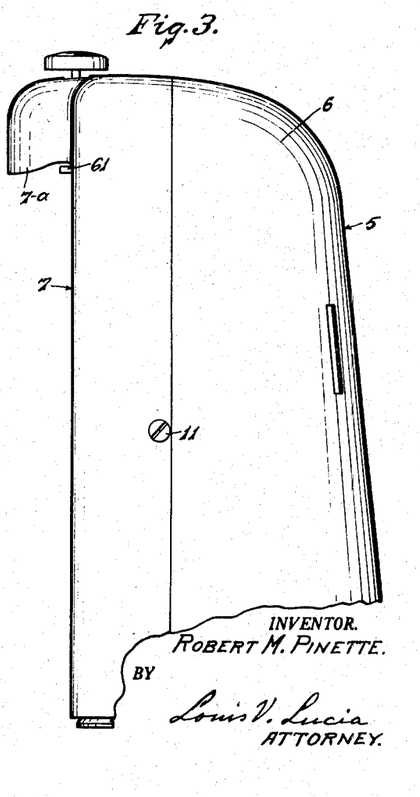
Fig. 3 is a side view thereof.
Figure 4:
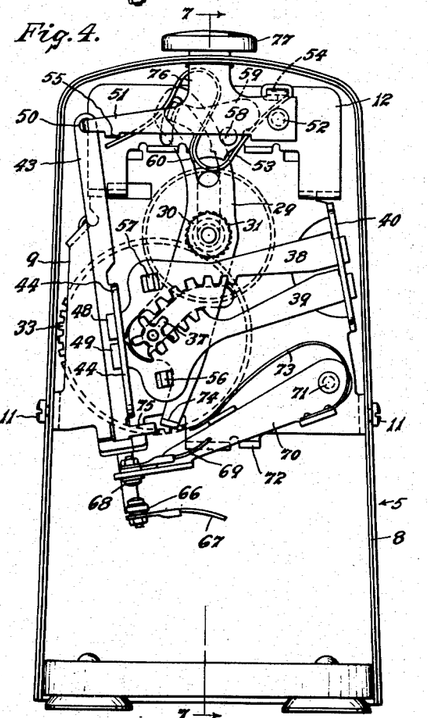
Fig. 4 is a front view of the device with the front cover removed therefrom and illustrating the mechanism in normal position.
Figure 5:
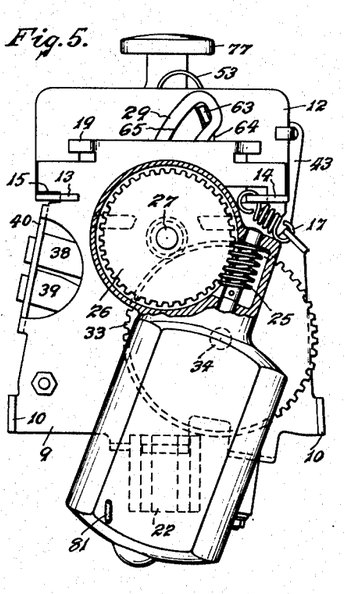
Fig. 5 is a rear view of the operating mechanism with parts thereof shown in section.
Figure 8:
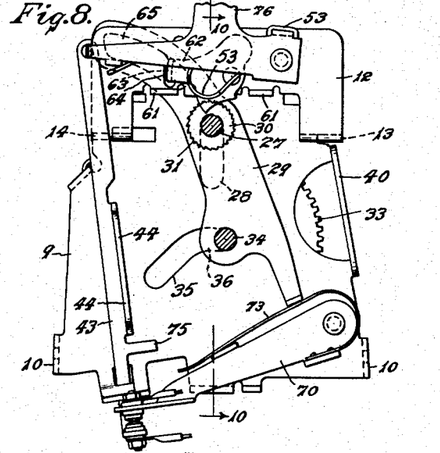
Fig. 8 is a front view of the mechanism showing the parts in operating position.
Figure 9:
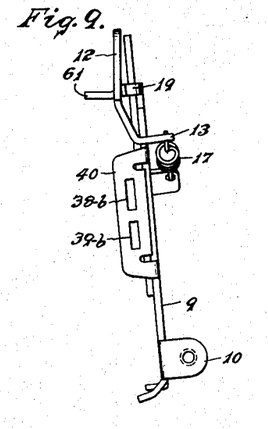
Fig. 9 is a side view thereof.

The swinging movement of the lever 29 also causes the finger 74 thereof to engage the spring 73, as clearly illustrated in Fig. 8, and thereby applies additional force against the lever 70 which will pull downwardly on the bar 43 and the lever 51 and thus force the feeler spring 53 to tension it against the top surface of the can cover so that, when the cover has been completely severed from can, the said spring will move downwardly into the can opening. This will lower the lever 51 and the bar 43 so that the cam 47-a will move the rack 39 out of the path of the pinion 37 while the cam 46 moves the rack 38 into mesh with the said pinion; whereby the spindle 34 will be moved toward the left in the slot 36 until it returns to its normal position, as illustrated in Fig. 4, wherein it is past the end of the row of teeth 41 and out of mesh therewith. This movement of the spindle to its normal position causes the lever 29 to carry the feed wheel 30 downwardly in back of the wall 78 while at the same time the said lever will raise the cutter member 59 to its normal position and disengage the opened can so that it may be easily removed.

After the rack 38 has moved into mesh with the pinion 37, as above described, the said pinion is driven by the electric motor 20 until the spindle 34 has travelled down the slot 35 for a major portion of its length and the downward movement of the bar 43 causes separation of the contacts 66 and 68 and de-energization of the motor. The momentum of said motor will then continue to drive the pinion 37 until said spindle 34 is returned to its normal position at the bottom of the slot 35 and the can opening operation is completed.

It will be understood from the above description that, in the normal condition of the device, the said spring 53 may be easily raised with a light upward push of the can and that, during the cutting operation, the said spring is urged downwardly against the cover of the can by means of the spring 73. This facilitates the operation of placing the can in cutting position and provides added pressure upon the feeler spring 53 during the cutting operation to render positive the downward movement of said spring 53 and the lever 51 to reverse the shifting of the racks 38 and 39 and thereby terminate the cutting operation after the can cover has been completely severed from the can.

Figure 6:
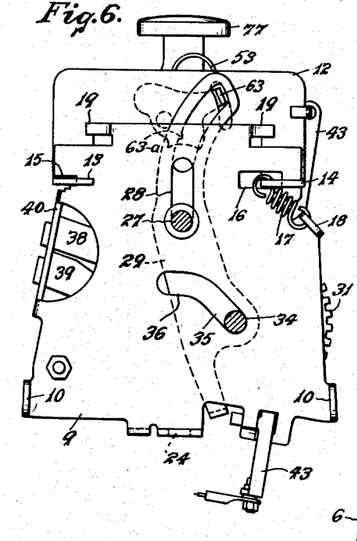
Fig. 6 is a similar view with the motor removed to show other parts of the mechanism.

The cam slot 65 of the lever 29 is preferably provided at its edge with a detent 63-a, Fig. 6, which is adapted to engage the operating lip 63 of the cutter 59 and lock said cutter in its cutting position during the operation of the cutting mechanism.

It will also be understood that as the feed wheel 30 moves into its cutting position, it will engage and force the flange of the can against the shoes 61—61 and against the pull of the spring 17; whereupon the said spring will yield to permit movement of the carrier plate 12 so that the pressure shoe portion 12-a thereof will be urged by said spring against the top of the can flange and thereby retain the bottom side of said flange in firm engagement with the teeth of said feed wheel to insure rotation of the can during the cutting operation. The upward pressure applied to the plate 12 will cause it to pivot in the notch 15 and the opposite side of said carrier plate will swing upwardly under the tension of the spring 17 and its movement will be limited by engagement of the foot 14 with the top of the opening 16 in the supporting plate.

The pivotal points of the carrier plate 12, in the notch 15 and on the spring 17, are located rearwardly of the cutter 62 so that, when the cutter is in its cutting position, the upward pressure on the carrier plate 12 will cause said plate to swing rearwardly and thereby force the cutter towards the wall of the can being opened and flattening the severed edge of the cover against the inside of the can wall.

The feed wheel is urged against the back surface of the front wall 78 by means of the spring 79 which pulls upwardly on the motor 20 and thereby swings the entire mechanism which is carried on the supporting plate about the pivotal points of the ears 10—10 that pivotally mount the said mechanism upon the casing. This swinging movement of the mechanism retains the feed wheel in contact with the inner side of the wall 78 and thereby causes said feed wheel to move into close proximity with the side surface of the can that is to be opened and insures a positive grip of the flange by the feed wheel.

Figure 16:
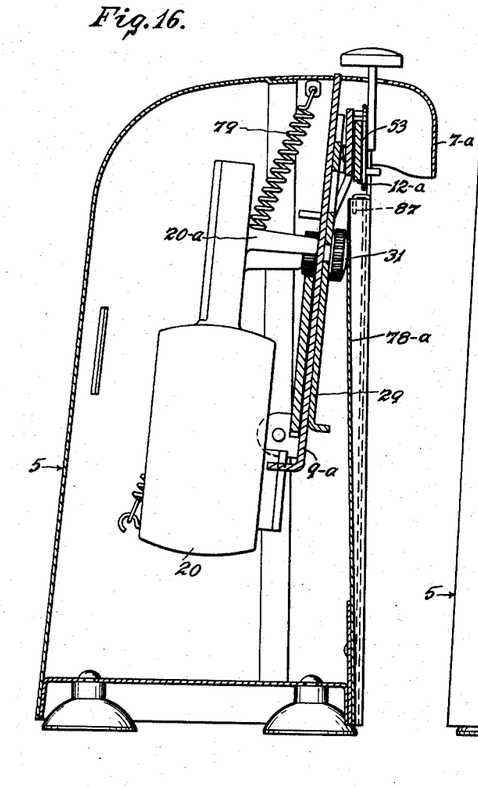
Fig. 16 is a sectional side view illustrating a modified form of said device.
Figure 17:
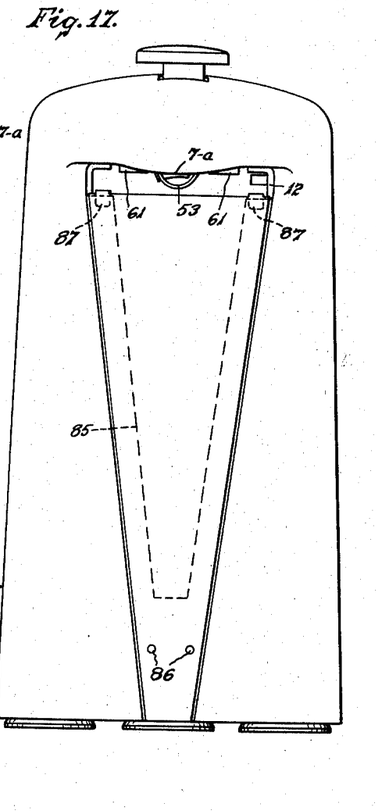
Fig. 17 is a front view thereof.

In the modified form illustrated in Fig. 16, swinging movement of the mechanism is eliminated and the supporting plate 9-a is extended at its top into a suitable hole in the casing so as to retain the entire mechanism rigidly in position. In this modified form, however, the front wall of the casing is made yieldable and is preferably constructed of a separate member 78-a which extends across an opening 85 in the front of the casing and is secured at 86. The said member 78-a is made of spring metal and normally tensioned inwardly of the casing and thereby retained in contact with the feed wheel 30 so that, as the feed wheel raises into cutting operation, the said front wall member 78 will yield forwardly and allow movement of the feed wheel towards the can while at the same time permitting the can to be positioned close to the said feed wheel and thereby providing a positive grip between the feed wheel and the bottom side of the flange. In this modified form, the outward flexing of the member 78-a is preferably limited by means of stops 87 which engage the inner marginal portion of the upper edge of the front wall of the casing.

As shown in Fig. 10, a magnet 88 may be suitably mounted in the forwardly extending hood portion 7-a so that its bottom surface will be disposed below the shoes 61—61 to contact the can cover and thereby prevent said cover from dropping into the can upon being severed therefrom by an operation of my above described mechanism. However, the pull on the cover by said magnet is such that it will not prevent the cover from tipping, even when the magnet is stationary, and thereby allowing the lever 51 to be pulled down by the spring 73 for terminating the operation of the device while the cover is still being held by the magnet. As well known in the art, such magnets are usually loosely mounted so as to allow adjustment of the can cover relatively to the cutter and, in such cases, the cover can easily move, upon having been severed from the can, to allow downward movement of the lever 51.

In order to securely retain the flange of the can between the feed wheel 31 and the shoe 12-a, while it is being rotated by said feed wheel, the cutter member 59 is provided with a guide portion 59-a which extends for the full height of said flange, as clearly shown in Figs. 19 and 18, and engages the inner side thereof to guide it onto the feed wheel, as the can is rotated in the direction of the arrow shown in Fig. 18, and thereby prevents the said flange from running off the feed wheel.

If desired, the cutter member may be formed as shown in Fig. 20 wherein the cutter 59-b is rigidly secured to the carrier plate 12 and does not have the guide portion, but a separate guide projection 59-c is provided upon the said carrier plate to guide the can flange onto the feed wheel in the same manner as it is guided by the portion 59-a in Fig. 19.

It will be noted that the free leading edge of the guide portion 59-a is preferably inclined upwardly in the direction of movement of the flange at the cutter so that it will tend to guide the flange upwardly onto the feed wheel and, at the same time, urge the said flange upwardly on the guide portion to retain the guide portion in engagement with the flange during the rotation of the can.

I claim:

1. An automatic can opener mechanism including a pressure shoe, a cutter, a driving wheel, a motor, means driven by said motor for causing engagement of said driving wheel with the cover securing flange of a can placed between said shoe and driving wheel to rotate the can, said means being adapted for moving the cutter into cutting engagement with the cover of said can upon the flange being engaged by said driving wheel, means operable by the cover of the can, upon the can being placed in opening position, for causing energization of the motor for an opening operation, the said latter means being operable upon severance of the cover from the can to cause de-energization of the motor and disengagement of the flange from the cutter, shoe and driving wheel.

2. An automatic can opener including a casing having a front wall terminating in a free edge portion and mechanism contained within said casing for cutting off the cover of a can placed against said wall with the cover securing flange of the can extending over said free edge; the said mechanism including a supporting member, a feed wheel mounted upon said supporting member back of the said front wall and movable vertically relatively thereto into engagement with the said flange for rotating the can, a motor for driving said feed wheel, a cutter for cutting off the can cover during the rotation of said can, and mechanism driven by said motor for moving the cutter into cutting engagement with the can cover.

3. An automatic can opener including a casing having a front wall terminating in a free edge portion and mechanism contained within said casing for cutting off the cover of a can disposed against said wall with the cover securing flange thereof extending over said free edge, the said mechanism including a supporting member, a feed wheel mounted upon said supporting member and movable relatively thereto into engagement with the said flange, a pressure shoe engageable with the top of the flange for retaining it in engagement with the feed wheel, a cutter member, a motor for driving said feed wheel, and means driven by said motor for moving the feed wheel into engagement with the flange of the can and the cutter member into cutting position relatively to the cover of the can while the flange thereof is held between the shoe member and the feed wheel.

4. An automatic can opener as set forth in claim 3 including means for causing de-energization of the motor and terminating the cutting operation upon the cover of the can having been severed therefrom.

5. An automatic can opener as set forth in claim 3 including means for automatically returning the feed wheel and cutter member to their normal positions upon completion of the cutting operation.

6. An automatic can opener including a casing having a front wall portion and mechanism contained within said casing for cutting off the cover of a can disposed against said front wall with the cover securing flange thereof extending over the top of said wall portion; the said mechanism including a supporting member, a motor movably mounted upon said supporting member, a feed wheel driven by and movable with said motor from a normal position into position to engage one side of the said flange of the can, a shoe member for engaging the opposite side of the flange to retain it in engagement with the feed wheel, a cutter member, means driven by said motor for moving said cutter member into cutting position relatively to the can cover upon the flange being engaged between the said shoe and feed wheel, and means operable upon placing the can in opening position for initiating the opening operation of said mechanism, the said latter means being operable upon the cover being severed from the can for terminating the opening operation.

7. An automatic can opener mechanism including a supporting member, a carrier member pivotally mounted upon said supporting member, a shoe carried by said carrier member, a cutter pivotally mounted upon said carrier member, a feed wheel movable upon said supporting member from a normal position into engagement with the cover securing flange of a can placed against the said shoe, a motor for driving said feed wheel to rotate the can, means operable by the motor for moving the feed wheel into flange engaging position and for moving the cutter into cutting position relatively to the can cover, and spring means yieldingly urging the cutter against the inner side of the can wall during the cutting operation on said cover to thereby retain the can between the shoe and feed wheel and flatten the severad portion of the cover remaining on the can against the said inner side of the can wall.

8. An automatic can opening mechanism including a supporting member having mounted thereon a motor, a feed wheel driven by said motor, a shoe member, a cutter member, an electric circuit for energizing said motor, a normally open switch for controlling said circuit, switch operating means operable by engagement with the can cover, upon a can being placed in position to engage said shoe, to close the switch and thereby cause energization of said motor, means operable by the motor for moving the feed wheel into engagement with the can flange, the said feed wheel moving means being operable to move the cutter member into cutting position relatively to the can cover, the said switch operating means being operable upon the cover being completely severed from the can to cause opening of the switch and thereby deenergizing the motor, and means operable by switch opening movement said switch operating means for causing return of the feed wheel and cutter member to their normal positions upon the cover being completely severed from the can.

9. An automatic can opening mechanism including a supporting plate having a cam slot and a separate slot extending through said supporting plate, a drive shaft extending through said separate slot, a feed wheel mounted upon the end of said drive shaft, a motor for driving said shaft to rotate the feed wheel, a lever pivotally mounted upon said drive shaft and carried thereby, a spindle rotatably mounted upon said lever and extending through the cam slot, a pinion mounted upon said spindle, a driving connection between said spindle and drive shaft, a shoe for engaging the top of the flange of a can securing the cover thereto, an electric circuit for energizing the motor, a normally open switch for controlling said circuit, means including a switch operating bar operable upon the can being placed near the shoe for closing said switch and thereby causing energization of the motor, a cutter member movable by said lever into and out of cutting position relatively to the can cover, a first rack and a second rack engageable with said pinion, means operable by movement of said switch operating bar for moving the first rack into engagement with the pinion and thereby causing movement of the spindle in the cam groove to raise the lever and move the drive shaft in the separate slot for carrying the feed wheel into engagement with the bottom of the can flange, means upon said lever operable upon swinging movement thereof to move the cutter member into cutting position relatively to the can cover, means for moving the switch operating bar to open the switch upon the cover having been completely severed from the can, means upon said bar operable during the switch opening movement thereof to move the second rack into engagement with the pinion and thereby cause return of the spindle along the cam slot to its normal position for causing lowering of the lever and thereby returning the drive shaft, feed wheel and cutter to their normal positions.

10. An automatic can opener mechanism including a supporting plate having a cam slot with lower and upper ends and a separate slot extending through said plate, a drive shaft extending through said separate slot, a lever pivotally mounted on and carried by said drive shaft, a feed wheel mounted upon the outer end of said drive shaft, a cutter member, a shoe, a spindle extending through the cam slot and rotatably mounted in the said lever, a driving connection between said spindle and drive shaft, a pinion mounted upon the outer end of said spindle, an electric motor, a driving connection between said motor and the drive shaft, an electric circuit for energizing said motor, an electric switch for controlling said circuit, means including an operating bar for closing said switch upon the can being placed in cutting position relatively to said cutter member, a first rack adapted to be moved into position to mesh with the pinion and move said spindle along the cam slot to condition the mechanism for a can opening operation, a separate rack adapted to be engaged with the pinion for moving the spindle in the cam slot to its normal position to thereby return the mechanism to its normal condition after completion of a can opening operation, means operable upon movement of the switch operating bar to switch closing position for moving the first rack into engagement with the pinion and causing movement of the spindle from the lower end of the cam slot to its upper end and thereby moving the feed wheel into engagement with the can flange and the cutter member into cutting position relatively to the can cover and means operable upon movement of said operating bar to switch opening position for causing movement of the second rack into engagement with the pinion while at the upper end of the cam slot and causing movement of the spindle from said upper end to the lower end of the cam slot.

11. An automatic can opener mechanism including a supporting plate having a cam slot therein and a vertically disposed separate slot extending through said plate, a motor slidably mounted upon the rear of said plate, a drive shaft movable with said motor, the said drive shaft having a driving connection to said motor and extending through the said separate slot, a lever disposed upon the front of said plate and pivotally mounted upon said driving shaft, a feed wheel secured to the front end of said driving shaft, a spindle rotatably mounted upon said lever and extending through said cam slot, a driving connection between said spindle and drive shaft, a pinion secured to said spindle and disposed in front of said supporting plate, a pivotally mounted cutter disposed above said wheel, an extension on said lever connected to said cutter for moving the cutter downwardly in the direction of the feed wheel, a shoe for engaging the upper edge of a cover securing flange of a can to be opened by said mechanism, a rack shiftable into mesh with said pinion for moving the spindle upwardly along the cam slot and thereby raising the lever and moving the feed wheel into driving engagement with the lower end of the said flange and rocking the extension on said lever and thereby swinging the cutter into cutting engagement with the can cover, and a separate rack shiftable into mesh with said pinion for returning the spindle and lever to their normal positions at the bottom of the cam slot and thereby returning the feed wheel and cutter to their normal positions.

12. An automatic can opener mechanism including a supporting plate having mounted thereon a drive shaft, a motor carrier having a driving connection with said drive shaft, a feed wheel mounted upon said drive shaft, a lever pivotally mounted on said drive shaft, a spindle rotatably mounted on said lever, a driving connection between the spindle and drive shaft, means engageable with said pinion for swinging the lever, a pivotally mounted cutter, an extension on the lever for swinging the cutter in the direction of the feed wheel during swinging movement of the lever, means for raising the lever during the swinging movement thereof and thereby raising the feed wheel into engagement with the can flange, a shoe for retaining the can flange in engagement with the feed wheel, and a separate rack shiftable into mesh with the pinion for causing return of the spindle to the lower end of the cam slot and thereby returning the lever, feed wheel and cutter to their normal position and terminating the opening operation upon said can cover.

13. An automatic can opener including a casing having a front wall portion, a supporting plate pivotally mounted in said casing and having a vertically disposed slot therein and an upwardly inclined cam slot, a motor slidably mounted upon the rear of said supporting plate, a drive shaft mounted on said motor and extending through said vertically disposed slot, a driving connection between the drive shaft and the motor, a spindle extending through the upwardly inclined cam slot, a pinion on said spindle, a driving connection between the spindle and drive shaft, a lever pivotally mounted upon said drive shaft and disposed upon the front of the supporting plate, a feed wheel secured to the front end of the drive shaft and disposed adjacent the rear surface of the said front wall portion, the said supporting plate having its upper portion inclined toward the said wall portion, means urging the supporting plate in the direction of the said front wall portion to thereby retain the feed wheel adjacent thereto, a shoe mounted on said supporting plate, a feeler member operable by the cover of the can upon the can being placed in position with the flange thereof extending over the said wall portion and near the said shoe, an electric circuit for energizing the motor, an electric switch for controlling the circuit, a connection between said feeler member and electric switch for closing the circuit upon the placing of the can in said position and thereby initiating the operation of said mechanism, means engageable with the pinion during the rotation thereof for moving the spindle upwardly in the cam slot and thereby raising the lever and moving the feed wheel into engagement with the bottom of the can flange, an extension on the lever for swinging the cutter into cutting engagement with the can cover, a projection on said lever operable for retaining the switch in closed position during the operation of the mechanism, the said feeler member being operable upon the cover having been severed from the can to cause opening of the switch and return of the feed wheel and cutter to their normal position and thereby terminating the operation of said mechanism.

14. An automatic can opener mechanism including a supporting plate, a cutter on said plate, a drive shaft movably mounted on said plate, a feed wheel secured to said drive shaft, a lever pivotally mounted on said drive shaft, a spindle rotatably mounted on said lever, a driving connection between said spindle and drive shaft, cam means cooperating with said spindle for raising and lowering the lever during swinging movement thereof about the drive shaft to raise and lower said drive shaft and thereby move the feed wheel relatively to the cutter, a first and a second rack pivotally mounted upon said supporting plate and movable into and out of mesh with the said pinion for swinging the lever in opposite directions, a motor for driving the drive shaft, an electric circuit for energizing said motor, an electric switch for controlling said circuit, means operable by a can inserted between said cutter and feed wheel for closing said switch and moving the first rack into mesh with the pinion to thereby cause swinging movement of the lever to raise the feed wheel toward the cutter, the said switch closing means being operable upon the cover being severed from the can to open the switch and move the first rack out of the path of the pinion and move the second rack into mesh with the pinion and thereby return the pinion, lever and feed wheel to their normal positions.

15. An automatic can opener mechanism as set forth in claim 14 wherein the switch operating means includes a bar operable upon the can being placed between the cutter and feed wheel, and cam means on said bar for alternately moving the first and second racks into and out of engagement with the pinion.

16. An automatic can opener mechanism as set forth in claim 13 wherein the upwardly inclined cam slot has opposed cam surfaces cooperating with the spindle to raise and lower the lever and the said racks include teeth disposed adjacent to and conforming with the said cam surfaces whereby, when the first rack is in mesh with the pinion, the spindle will travel up the cam slot and, when the second rack is in mesh with the pinion, the spindle will travel down the cam slot.

17. An automatic can opener mechanism as set forth in claim 13 wherein the upwardly inclined cam slot has opposed cam surfaces cooperating with the spindle to raise and lower the lever during swinging movement thereof and the said cam slot has a portion for retaining the lever in raised position to thereby secure the feed wheel in raised position during a can opening operation of said mechanism.

18. An automatic can opener mechanism including a supporting plate, a cutter, a drive wheel movable on said plate towards said cutter, a motor for driving said feed wheel, a feeler member movable by engagement with the cover of a can placed between the said cutter and feed wheel, means operable upon movement of said feeler member by the can cover to cause initiation of a can opening operation of said mechanism, a spring, and means operable during the said operation of the mechanism for applying the force of said spring against the feeler member to bias said feeler member in the direction of the can cover.

19. An automatic can opener mechanism including a supporting plate, a drive shaft movably mounted on said plate, a feed wheel secured to said drive shaft, a motor movable with said drive shaft, a driving connection between said motor and drive shaft, a cutter mounted on said supporting plate, means driven by said motor for raising and lowering the feed wheel relatively to the cutter, an electric circuit for energizing said motor, an electric switch for controlling said circuit, the said switch including a lever pivotally mounted on the supporting plate and having an electric contact member thereon, a spring carried by said lever, a feeler lever, a feeler member engageable by the cover of a can placed between the cutter and feed wheel for moving said feeler lever, a bar connected to the feeler lever and carrying an electric contact member thereon, the said bar being operable by the feeler lever to move the contact member thereon into engagement with the contact member on the switch lever and to cause operation of the means for raising and lowering the feed wheel, and means in said mechanism engageable with said spring after initiation of a can opening operation of the mechanism for applying a force from said spring to bias said feeler member against the can cover.

20. Automatic can opener mechanism including a supporting plate, a carrier plate pivotally mounted on said supporting plate for pivotal movement in vertical and lateral directions, a cutter pivotally mounted on said carrier plate, a feed wheel movably mounted on the supporting plate, a motor for driving said feed wheel, means for raising and lowering the feed wheel relatively to the cutter to cause cutting engagement of the cutter relatively to the can cover, a shoe on said carrier plate for supporting the can in engagement with the feed wheel, and spring means between the supporting plate and the carrier plate biasing the carrier plate downwardly and rearwardly to urge the shoe toward the feed wheel and thereby retain the can in engagement therewith and the cutter against the inner wall of the can side.

21. An automatic can opener mechanism including a supporting plate, a carrier plate pivotally mounted upon said supporting plate for vertical and horizontal pivotal movement relatively to the supporting plate, a spring member between said supporting and carrier plates for yieldingly resisting movement of the carrier plate relatively to the supporting plate, a feed wheel mounted upon the supporting plate and movable thereon relatively to the cutter, a motor movable with said feed wheel and having a driving connection therewith, a feeler lever pivoted upon said carrier plate, a yieldable feeler member secured to said feeler lever and disposed in position to engage the cover of a can placed adjacent to the cutter and operable by said cover to move said feeler lever, means operable upon the movement of said feeler lever to cause energization of the motor and movement of the feed wheel in the direction of the cutter and into engagement with the cover securing flange of the can, the said feeler lever being movable upon severance of the cover from the can to cause de-energization of the motor and operation of the mechanism for returning the feed wheel to its normal position.

22. An automatic can opener mechanism as set forth in claim 21 including means extending from the feeler lever providing a handle for manually operating said lever.

23. An automatic can opener mechanism including a casing having a front wall portion, a supporting plate pivotally mounted in said casing, a cutter mounted upon said supporting plate, a feed wheel on said supporting plate movable in the direction of the cutter, a motor for driving said wheel and for raising and lowering it relatively to the cutter, a spring anchored to said casing and connected to the supporting plate for urging said supporting plate in the direction of the front wall portion and thereby yieldingly urging the feed wheel against the inner side of the said wall portion in position to engage the flange of a can extending over the said wall portion and disposed between the cutter and feed wheel.

24. An automatic can opener mechanism including a casing having a front wall portion with a free upper edge, a supporting plate mounted in said casing and having the upper portion thereof inclined toward the said front wall portion of the casing, a cutter mounted upon said supporting plate and disposed above the said free edge of the front wall portion, a feed wheel disposed upon the front of said supporting plate and movable upon the plate thereof toward and away from the cutter, the said feed wheel being disposed adjacent to the inner surface of the front wall portion and the said front wall portion being yieldable upon being contacted by the feed wheel to permit movement of the said feed wheel in the direction of the cutter and provide engagement of the feed wheel with the flange of a can disposed above the said free edge and between the cutter and feed wheel.

25. An automatic can opener including a casing having a front wall portion with an upper edge and an elongated concavity therein for locating a can in opening position with its cover securing flange extending over the said upper edge, a mechanism mounted within said casing including a cutter mounted above said upper edge, a feed wheel movable upwardly within said casing toward said cutter and into engagement with said flange, the said feed wheel, being movable toward said wall portion and engageable with the inner side thereof, and yieldable means for retaining said feed wheel in contact with said inner surface during the upward movement of the feed wheel toward the flange.

26. In a can opener of the character described comprising a feed wheel for engaging the underside of a can flange to rotate the can for an opening operation, a supporting member, a cutter extending downwardly from said supporting member to engage and cut the can cover along the inner edge of the flange, and a projection extending downwardly from said supporting member adjacent the leading edge of the cutter for engaging the inner side of the can flange and guiding said flange onto the feed wheel and retaining it thereon.

27. An automatic can opener including a casing having a front wall with a free upper edge and a top wall having an integral portion overhanging said front wall and extending downwardly and forming an inverted recess exteriorly of and above said free edge, a mechanism within said casing for opening a can placed against said wall portion with the cover securing flange of said can extending over said free edge, and a magnet mounted within said recess of the over-hanging portion of the casing in position to retain the can cover after it has been severed from the can.

28. An automatic can opener mechanism including a supporting plate, a carrier plate pivotally mounted on said supporting plate, a cutter pivotally mounted on said carrier plate, a feed wheel movably mounted on the supporting plate, a motor for driving said feed wheel, means for raising and lowering the feed wheel relatively to the cutter to cause cutting engagement of the cutter with the can cover, an abutment on the carrier plate engageable with the can, spring means between the supporting plate and the carrier plate biasing the said carrier plate downwardly to urge the can towards the feed wheel and thereby retain the cutter in engagement therewith; the said carrier plate having its pivotal connection with the carrier plate at a point rearwardly of the cutter whereby the upward pressure applied to the abutment on the carrier plate by the can will swing said carrier plate rearwardly and force the cutter against the inner wall of the can side to flatten the severed edge of the cover against the said wall during a cutting operation.

29. An automatic can opener including a cutter, a driving wheel, a motor, mechanism driven by said motor for causing engagement of said driving wheel with the cover securing flange of a can placed in a position between said driving wheel and cutter for an opening operation, an electric circuit for energizing said motor, and means operable by engagement with the cover of the can upon the can being placed in said position to cause energization of the motor and retain said motor energized during the opening operation.

30. An automatic can opener as set forth in claim 29 wherein the said means are adapted to cause de-energization of the motor upon the severance of the cover from the can.

31. An automatic can opener mechanism including a supporting member, a motor mounted upon said supporting member, a feed wheel driven by said motor, a shoe for engaging the top of a flange on a can which secures the cover thereto, means operable upon placing the can in engagement with said shoe for causing energization of the motor, means for carrying the feed wheel from a normal position into engagement with the bottom side of the can flange, a cutter member, means for moving said cutter into the can cover adjacent the inner side of the can wall and thereby cutting off the can cover during the rotation of the can by the feed wheel, a carrier for the cutter member, and spring means connected to and biasing said carrier to urge the cutter against the inner side of the can wall.

32. An automatic can opener mechanism including a supporting member, a motor mounted upon said supporting member, a feed wheel driven by said motor, a shoe for engaging the top of a flange on a can which secures the cover thereto, means operable upon placing the can in engagement with said shoe for causing energization of the motor, means for carrying the feed wheel from a normal position into engagement with the bottom side of the can flange, a cutter member, means for moving said cutter into the can cover adjacent the inner side of the can wall and thereby cutting off the can cover during the rotation of said can by the feed wheel, a carrier for the shoe, and spring means urging said carrier in the direction of the feed wheel to thereby yieldingly force the shoe into engagement with the can flange.

References Cited in the file of this patent

UNITED STATES PATENTS

| | | |
|---|---|---|
| 1,534,932 | Edlund | Apr. 21, 1925 |
| 2,102,174 | Aeschback | Dec. 14, 1937 |
| 2,204,368 | Kublin | June 11, 1940 |
| 2,508,921 | Leitch | May 23, 1950 |
| 2,570,721 | Russell | Oct. 9, 1951 |
| 2,579,189 | Jenson | Dec. 18, 1951 |
| 2,582,504 | Reed | Jan. 15, 1952 |
| 2,602,223 | Pauhu | July 8, 1952 |
| 2,603,857 | Hanby | July 22, 1952 |
| 2,677,175 | Wild | May 4, 1954 |
| 2,755,548 | Fleming | July 24, 1956 |